United States Patent Office 3,532,691
Patented Oct. 6, 1970

3,532,691
SYNTHESIZED NITROFURYL DERIVATIVES
Erich Haack, Heidelberg, Herbert Berger, Sulzberg, Allgau, and Wolfgang Vömel, Mannheim, Germany, assignors to Boehringer Mannheim Gesellschaft mit beschrankter Haftung, Mannheim-Waldhof, Germany, a corporation of Germany
No Drawing. Continuation-in-part of application Ser. No. 452,355, Apr. 30, 1965, which is a continuation-in-part of application Ser. No. 351,841, Mar. 13, 1964. This application Dec. 6, 1966, Ser. No. 599,384
Claims priority, application Germany, Mar. 20, 1963, B 71,208
Int. Cl. C07d 29/00
U.S. Cl. 260—240   3 Claims

ABSTRACT OF THE DISCLOSURE

The application is directed to antimicrobial compounds effective against pathogenic micro-organisms having the formula:

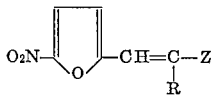

wherein R is hydrogen or alkyl and Z is either α- or γ-pyridyl and wherein Z carries at least one member of the group of polar and hydrophilic substituents composed of halogen, nitro, hydroxy, lower alkanoyloxy, carboxy, lower carbalkoxy, amino, lower alkanoylamino, carboxamido, carboxylhydrazido, N - β - oxyethylcarboxamido and N - β - oxyacetylcarboxyhydrazido. The application is also concerned with therapeutic compositions containing the aforesaid compounds as active ingredient and to methods of using these compounds.

---

The application is a continuation-in-part of application Ser. No. 452,355, filed Apr. 30, 1965, which, in turn, is a continuation-in-part of application Ser. No. 351,841, filed Mar. 13, 1964 both now abandoned.

This invention relates to antimicrobial compounds which are effective against pathogenic micro-organisms, including bacteria, protozoa, and fungi.

More particularly, the invention relates to new nitrofuryl derivatives, therapeutic compositions containing the same as active ingredient, and to methods of using these compounds.

A great deal of work has been carried out in developing antimicrobial compounds such as the nitrofuryl compounds which act to relieve and eliminate the symptoms of microbial infections. In evaluating the usefulness of these antimicrobials, five interrelated factors need to be considered: (1) general antimicrobial activity; (2) specific antimicrobial activity; (3) period of effectiveness, i.e., whether the action is fleeting or prolonged; (4) deleterious side effects, and (5) the modes in which the substance may be effectively administered. The clinical usefulness of these compounds has heretofore been limited in that they have a weak and fleeting action, a high instance of undesirable, and sometimes deleterious, side effects and/or are limited by the mode in which they can be administered.

There has now been discovered and synthesized a new group of superior antimicrobial compounds having the structural formula:

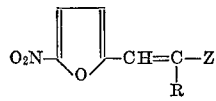 (1)

wherein R is a member of the group consisting of hydrogen and lower alkyl, preferably methyl, and Z is a member selected from the group consisting of α- and γ-pyridyl and wherein Z carries at least one substituent selected from the group consisting of polar and hydrophilic substituents composed of halogen, nitro, hydroxy, lower alkanoyloxy, carboxy, lower carbalkoxy, amino, lower alkanoylamino, carboxamido, carboxyhydrazido, N - β - oxyethyl - carboxamido, and N - β - oxyacetyl - carboxyhydrazido, and the quaternary ammonium salts and N-oxides thereof.

Experiments indicate that the compounds in accordance with the invention have marked prolonged antimicrobial action, little or no incidence of undesirable side effects enabling the administration of much greater amounts than heretofore possible and, furthermore, the compounds can be innocuously administered, parenterally, orally, and topically.

It has also been found that in these compounds the nature and the position of the substituents on the pyridyl nucleus have an important influence on their spectrum of activity and are an indicia of the instances and situations where the administration of these substances is indicated.

The preparation of the new compounds is carried out using methods which are known to the art. A preferred method comprises the condensation of 5-nitrofurfurol or the diacetate thereof with a compound having the formula

wherein R and Z have the same meanings as given above and B is two hydrogen atoms.

This reaction can, however, also be conducted by condensing 5 - nitro - 2 - methyl - furan with an aldehyde having the formula:

wherein R and Z have the same meanings as given above.

In a further method of synthesizing the novel compounds of the invention, 5 - nitrofurfurol is, for example, converted with a corresponding heterocyclically substituted alkyl-magnesium halide or, alternatively, by reacting a substituted heterocyclic aldehyde or ketone with the Grignard compounds of 5 - nitro - 2 - halogen methyl furan and thereafter dehydrogenating the compounds formed to produce the olefin.

It is also possible to use in the above-mentioned processes the corresponding un-nitrated furan derivatives as reaction components, in which case a nitration of the furan nucleus in the 5-position has to be carried out following the condensation.

In the case of many of the above substituents of the pyridine ring, it is advantageous not to introduce or split off the same until after the condensation has been completed. Thus, for example, the amino-substituted compounds are advantageously prepared by saponifying the corresponding acylamino compounds.

The new compounds can be converted in the conventional manner into their quaternary ammonium salts or into their N-oxides. Those skilled in the art can use well-known standard techniques for preparing the salts and the N-oxides.

The antimicrobial activities of some of the new nitrofuryl derivatives are compiled in the table below together with the three most potent known nitrofuryl compounds.

The new nitrofuryl derivatives assayed for antimicrobial activity and the known nitrofuryl compounds are as follows:

(1) 1-(5-nitro-2-furyl)-2-(5-nitro-2-pyridyl)-ethylene
(2) 1-(5-nitro-2-furyl)-2-(6-carbomethoxy-2-pyridyl)-ethylene
(3) 2-[2-(5-nitro-2-furyl)-vinyl]-pyridine-6-carboxylic acid (4) 1-(5-nitro-2-furyl)-2-(2-amino-4-pyridyl)-ethylene
(5) 2-[2-(5-nitro-2-furyl)vinyl]-pyridine-6-carboxylic acid-$\beta$-oxyethylamide
(6) 1-(5-nitro-2-furyl)-2-(6-carbo-$\beta,\gamma$-dioxy-n-propoxy-2-pyridyl)-ethylene
(7) 2[2-(5-nitro-2-furyl)-vinyl]-pyridine-6-carboxylic acid-N'-oxyacetylhydrazide
(8) 1-(5-nitro-2-furyl)-2-(2-amino-6-pyridyl)-ethylene
(9) 1-(5-nitro-2-furyl)-2-(6-amino-5-nitro-2-pyridyl)-ethylene
(10) 2-[2-(5-nitro-2-furyl)-vinyl]-6-pyridyl-diazomethyl-ketone
(11) Salt of 2-[2-(5-nitro-2-furyl)-vinyl]-6-pyridyl-bromomethyl-ketone with hexamethylenetetramine
(12) 1-(5-nitro-2-furyl)-2-(5-amino-2-pyridyl)-ethylene
(13) 1-(5-nitro-2-furyl)-2(3,5-dicarboxy-6-methyl-2-pyridyl)-ethylene
(14) 1-(5-nitro-2-furyl)-2-(3-acetoxy-2-pyridyl)-ethylene
(15) 1-(5-nitro-2-furyl)-2-(3-hydroxy-2-pyridyl)-ethylene
(16) 1-(5-nitro-2-furyl)-2-(5-carboxy-2-pyridyl)-ethylene
(17) Furacin-5-nitro-furfurole-semicarbazone
(18) Furoxon-N-(5-nitrofurfurylidene)-3-amino-oxazolidone-(2)
(19) Furaspor-5-nitro-2-furfuryl-methylether
(9) Furadantin-N-(5-nitro-furfurylidene)-1-amidohydantoin (U.S. Pat. 2,610,181)

The results of experiments are set out in the following table, the values having been calculated on the basis of 50 ml. urine.

TABLE II

Substance:

Bacterial maximum dilution of urine against *E. coli*

| | |
|---|---|
| 1 | 1:29 |
| 2 | 1:84 |
| 3 | 1:90 |
| 4 | 1:42 |
| 5 | 1:600 |
| 6 | 1:34 |
| 7 | 1:455 |
| 8 | 1:175 |
| 9 | 1:19 |

From the above table it can be seen that the compounds of the invention have an anti-bacterial activity in urine which is greater in every instance than the known compound Furadantin and that this greater activity amounts to up to 30 fold that of the known compound.

The following examples are given for the purpose of illustrating the new compounds and their preparation and are not to be taken as in anywise being a limitation thereof:

TABLE I

| Type of organism, strain of organism | Absolute minimum bacteriostatic concentration in micrograms per milliliter for | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Staphylococcus aureus, SG 511 | 1 | 2 | 1 | 0.25 | 0.25 | 0.5 | 0.5 | 0.5 | 0.25 | 0.5 | 2 | 2 | 256 | 4 | 4 | 8 | 8 | 1 | |
| Streptococcus pyogenes, Aronson | 2 | 128 | 16 | 0.5 | 0.5 | 0.25 | 0.5 | 2 | 4 | 128 | 8 | 128 | 256 | 64 | 256 | 2 | 16 | 16 | |
| Escherichia coli | 0.062 | 0.062 | 0.5 | 0.062 | 0.062 | 0.125 | 0.25 | 0.031 | 0.062 | 0.031 | 1 | 1 | >128 | 2 | 2 | 2 | 8 | 0.25 | |
| Proteus vulgaris | >2 | 256 | 64 | 8 | 256 | 256 | 256 | 16 | 8 | 128 | 128 | >128 | | >256 | | | 128 | 64 | |
| Pseudomonas aeruginosa | >2 | 128 | >128 | 2 | 128 | 128 | 128 | 16 | 64 | 2 | 32 | >64 | | >128 | | 8 | 128 | 64 | |
| Candida albicans | >4 | 8 | 128 | 128 | >128 | >256 | >256 | 2 | >64 | 2 | >64 | >256 | >256 | 128 | >128 | | | | 64 |
| Microsporum gypseum | 0.5 | 4 | 128 | 8 | >128 | 256 | >256 | 2 | 1 | 2 | 64 | 4 | >256 | 64 | >256 | 2 | | | 128 |
| Trichophyton mentagrophytes | 1 | 4 | 64 | 16 | >128 | >256 | >256 | 2 | <0.5 | 2 | 32 | 8 | >256 | 32 | 256 | | | | 128 |
| Aspergillus niger | >4 | 64 | 128 | 64 | >128 | >256 | >256 | 1 | 32 | >64 | >64 | 128 | >256 | 128 | 256 | | | | 128 |

The anti-microbial activity was measured by the conventional series dilution procedure, using a liquid nutrient procedure. In order to provide a broader basis for judgment and, in view of the dependence of the growth-inhibiting values on the strength of the bacterial inoculation, three to five different culture dilutions were used for each type of organism. The nitrofuran compounds were employed in the form of their aqueous solutions obtained by means of solubilizing organic solvents. In each individual test, any bacteriostatic action on the part of the organic solvent was excluded by conducting parallel control dilution series. These control dilution series contained the same solvent concentrations as the experimental series but no nitrofuran compounds. The minimum bacteriostatic concentration, as given in the table above, represents the lowest concentration of the compounds tested which acted to completely suppress the growth of the bacteria.

In another experiment, the compounds hereinafter set out were administered in a dose of 20 mg./kg. orally to rats; at least 10 rats being used for each compound tested. The urine of the test animals was collected for 22 hours and the bacteriostatic maximum dilution of the urine against *Escherichia coli* determined.

(1) 2-[2-(5-nitro-2-furyl)-vinyl]pyridine-6-carboxylic acid
(2) 1-(5-nitro-2-furyl)-2-(2-amino-6-pyridyly)-ethylene
(3) 1-(5-nitro-2-furyl)-2-(4-acetamido-2-pyridyl)-ethylene
(4) 1-(5-nitro-2-furyl)-2-(2-acetamido-4-pyridyl)-ethylene
(5) 1-(5-nitro-2-furyl)-2-(6-hydroxy-2-pyridyl)-ethylene
(6) 1-(5-nitro-2-furyl)-(2-hydroxy-4-pyridyl)-ethylene
(7) 1-(5-nitro-2-furyl)-2-(4-hydroxy-2-pyridyl)-ethylene
(8) 1-(5-nitro-2-furyl)-2-(4-acetoxy-2-pyridyl)-ethylene

EXAMPLE 1

1-(5-nitro-2-furyl)-2-(6-carbomethoxy-2-pyridyl)-ethylene 26 grams 2-methyl-pyridine-6-carboxylic acid methyl ester and 24.45 g. crude 5-nitro-2-fural in 172 ml. acetic anhydride were heated together for 3 hours, under reflux, at 160° C. (bath temperature). Thereafter the mixture was evaporated to dryness, the residue taken up in 160 ml. dioxane and water added until turbidity set in. The resulting mixture was then subjected to treatment with activated charcoal. The thusly treated mixture was, while still hot, suction-filtered and water then added to the hot clear filtrate until turbidity had set in. The material which crystallized out on cooling was separated and recovered. 9.3 g. of crystalline material having a melting point of 151–153° C. were thus obtained. Following recrystallization out of trichloroethylene in the presence of activated charcoal, the yellow crystalline material which was recovered melted at 154–155° C.

$C_{13}H_{10}N_2O_5$ (274). Calc'd. (percent): C, 56.90; H, 3.65; N, 10.22. Found (percent): C, 56.52; H, 3.66; N, 9.82.

EXAMPLE 2

2-[2-(5-nitro-2-furyl)-vinyl]-pyridine-6-carboxylic acid 2.74 grams carboxylic acid methyl ester obtained according to the procedure set out in Example 1 were dissolved in 50 ml. warm dioxane. 11 ml. normal caustic soda solution were added at room temperature to the resulting solution. The mixture was allowed to stand for one hour at room temperature and the crystals that separated out were suction-filtered and washed with 80% aqueous dioxane. The sodium salt of the carboxylic acid which was obtained by alkaline saponification of the methyl ester was dissolved in about 120 ml. warm water and 10 ml. of 2 N hydrochloric acid were then added to the resulting solution. The carboxylic acid which then separated out was recovered by suction filtering, washed with water and recrystallized from 80 ml. dioxane in the presence of activated charcoal. 1.55 g. of crystals having a melting point of 245–246° C. were obtained. An additional 0.35 g. of the acid could be isolated from the mother liquor by greatly concentrating the same under vacuum.

$C_{12}H_8N_2O_5$ (260). Calc'd. (percent): C, 55.40; H, 3.08; N, 10.77. Found (percent): C, 55.70; H, 3.55; N, 10.80.

EXAMPLE 3

2-[2-(5-nitro-2-furyl)-vinyl]-pyridine-6-carboxylic acid-β-oxyethylamide 2.74 grams of the methyl ester prepared according to the procedure set out in Example 1 were dissolved in 30 ml. of heated dioxane. 3.05 g. monoethanolamine were then added to the resulting solution and the mixture heated for 3 hours at 80° C. The dioxane solution thereupon separated out from the oil which had been formed. Approximately 5 times the volume of the dioxane solution in water were then added to the dioxane solution and the crystals which separated out recovered by suction filtering. 1.15 g. of crystalline material having a melting point of 136–138° C. were thus obtained. Following recrystallization from 30 ml. isopropanol, the yellow crystals recovered melted at 146–148° C.

$C_{14}H_{13}N_3O_5$ (303). Calc'd. (percent): C, 55.40; H, 4.29; N, 13.86. Found (percent): C, 55.35; H, 4.39; N, 13.68.

EXAMPLE 4

1-(5-nitro-2-furyl)-2-(2-amino-4-pyridyl)-ethylene 17.28 grams 2-amino-4-methylpyridine and 160 ml. acetic anhydride were heated for 15 minutes under reflux (160° C. bath temperature). Thereafter 22.4 g. crude 5-nitro-2-fural were added to the heated solution and the resulting mixture refluxed for a further 8 hours at a bath temperature maintained at 160° C. Following cooling, the material which had separated out was recovered by suction filtering and washed with glacial acetic acid back into the filtrate. This filtrate was then concentrated under vacuum. The concentrate was then taken up and boiled twice with 100 ml. portions of benzene and the benzene extracts combined and treated with a solution of 10 g. sodium bisulfite in 100 ml. water. Any unreacted 5-nitro-2-fural was removed. The resulting benzene solution was washed with water, dried and concentrated under vacuum. The concentrate was taken up in approximately 100 ml. carbon tetrachloride and any undissolved matter separated out. The clear organic solution remaining was then concentrated by evaporation. The residue thus obtained comprised 26.35 g. of an oil constituting 1-(5-nitro-2-furyl)-2-(2-acetamido-4-pyridyl)-ethylene. 6 g. of this oil was treated with 9 ml. 90% aqueous methanol solution. 0.92 g. of crystals were thereby produced. The pure acetamido compound having a melting point of 188–189° C. was obtained by recrystallization from a mixture of 6 ml. methanol and 2 ml. dioxane.

26.35 g. of the oily crude products were subjected to an acid hydrolysis by heating the same with a mixture of 70 ml. glacial acetic acid and 70 ml. 5 N hydrochloric acid for 1 hour at 100° C. The mixture was thereafter vacuum-dried and the residue taken up in a small amount of methanol. 3.3 g. of the crystals obtained following recrystallization out of 65 ml. 75% aqueous dioxane solution containing 1.65 ml. concentrated hydrochloric acid produced 2.3 g. of substantially pure 1-(5-nitro-2-furyl)-2-(2-amino-4-pyridyl)-ethylene in the form of its hydrochloride.

7.5 g. of the hydrochloride so obtained were dissolved hot in a mixture of 120 ml. water and 30 ml. ethanol. Concentrated ammonia was rapidly added to the solution under agitation until the pH had risen to about 9–10. The mixture was then rapidly cooled and allowed to stand for about an hour at room temperature. The crystalline material which thereupon separated out was recovered by suction-filtering, washed to neutrality with water and dried. There were thus obtained 6.2 g. 1-(5-nitro-2-furyl)-2-(2-amino-4-pyridyl)-ethylene, having a melting point of 181–183° C.

$C_{11}H_9N_3O_3$ (231). Calc'd. (percent): C, 57.10; H, 3.90; N, 18.18. Found (percent): C, 57.05; H, 4.05; N, 17.91.

EXAMPLE 5

1-(5-nitro-2-furyl)-2-(6-carbo-β,γ-dioxy-n-propoxy-2-pyridyl)-ethylene 1.37 grams of the carboxylic acid methyl ester prepared according to Example 1 were dissolved in 25 ml. of anhydrous glycerine by heating for about 15 minutes at 160° C. (bath temperature). Thereafter about 20 ml. p-toluenesulfonic acid dissolved in 5 ml. of glycerine were added to the solution and the resulting mixture heated for another 5 hours at 160° C. Another 10 ml. p-toluenesulfonic acid were then added, and the mixture allowed to react for another 2 hours at 160° C. About 7 times the volume of water was added to the cooled mixture and the precipitated material separated by suction-filtering and washed with water. There was thus obtained 1.45 g. of a yellow product which, following recrystallization from 35 ml. isopropanol (and treatment of the hot solution with activated charcoal) had a melting point of 172–173° C. The recrystallized product was obtained in a yield of 0.9 g. A further 0.16 g. of crystals could be isolated from the mother liquor by the vacuum concentration thereof.

$C_{15}H_{14}N_2O_7$ (334). Calc. (percent): C, 53.9; H, 4.19. Found (percent): C, 54.11; H, 4.29.

The molecular weight determined by potentiometric titration with $HClO_4$ in glacial acetic acid was 334.

EXAMPLE 6

1-(5-nitro-2-furyl)-2-(5-nitro-2-pyridyl)-ethylene 1.13 grams 5-nitrofurfurole were dissolved in a mixture of 0.8 g. acetic anhydride and 0.5 g. glacial acetic acid. 1.1 grams 2-methyl-5-nitro-pyridine were then added and the mixture heated for 3 hours under reflux (bath temperature 160° C.). The resulting mixture was vacuum-dried and the concentrate treated with ether. The solid product (1.9 g.) thus obtained was recrystallized out of 20 ml. dioxane, a small amount of undissolved material being removed. In this manner, 0.85 g. of crystalline material was obtained having a melting point of 212–214° C. additional crystalline material could be isolated from the mother liquor by vacuum concentration.

$C_{11}H_7N_3O_5$ (261). Calc. (percent): C, 50.6; H, 2.68; N, 16.1. Found (percent): C, 50.54; H, 2.33; N, 16.0.

EXAMPLE 7

2-[2-(5-nitro-2-furyl)-vinyl]-pyridine-6-carboxylic acid-N'-oxyacetylhydrazide 2.6 grams carboxylic acid obtained by the procedure described in Example 2 were diluted with 26 ml. of thionyl chloride and placed in a bath at a temperature of 95° C. After about 30 minutes a clear solution developed, which was boiled for another hour under reflux and then evaporated to dryness. 2.4 g. of 2-[2-(5-nitro-2-furyl)-vinyl]-pyridine-6-carboxylic acid chloride having a melting point of 141–142° C. were obtained from the concentrate following recrystallization from 60 ml. trichloroethylene.

$C_{12}H_7ClN_2O_4$ (278.5). Calc. (percent): Cl, 12.75. Found (percent): Cl, 13.04.

2 grams of the acid chloride thus obtained were dissolved hot in 22 ml. of absolute pyridine and 1 ml. triethylamine. 0.72 g. glycolic acid hydrazide were then added and the mixture maintained at 60° C. for 1½ hours, and vacuum dried. The residue was then subjected to boiling with 120 ml. of water and suction-filtered while hot. There were obtained 1.5 g. of undissolved material having a melting point of 190–209° C. An additional 0.15 g. of crystals having a melting point of 203–218° C. was isolated from the cooled aqueous filtrate. The crystalline material was combined and boiled with 100 ml. of dioxane. The clear, hot filtrate thus produced was concentrated to about 40 ml. and allowed to stand for crystallization to occur. There were recovered 1.3 g. of crystals having a melting point of 240–246° C. (decomposition). After recrystallization from acetone, the crystals melted at 253–260° C. (decomposition; discolors above 235° C.).

$C_{14}H_{12}N_4O_6$ (332). Calc. (percent): C, 50.6; H, 3.6; N, 16.86. Found (percent): C, 50.58; H, 3.59; N, 16.35.

EXAMPLE 8

2-[2-(5-nitro-2-furyl)-vinyl]-6-pyridyl-diazomethylketone

A solution of 7.5 g. of the carboxylic acid chloride (melting point 141–142° C.) obtained according to the procedure of Example 7 in a mixture of 80 ml. of absolute dioxane and 120 ml. of absolute ether was added dropwise to 85 ml. of an ether solution of 2.5 g. diazomethane, at 0° C., with stirring, within a period of about 30 minutes. The resulting suspension was allowed to stand overnight at room temperature. After suction-filtering and washing with ether, 6 g. of crystals have a melting point of 140–143° C., decomp.) were obtained. 1.3 g. thereof were crystallized from 25 ml. nitrobenzene on a steam bath, and treated with 0.1 g. activated charcoal. 0.6 g. of crystals having a melting point of 141–143° C. (decomp.) were obtained from the clear filtrate. Following a second recrystallization from dioxane, the crystals melted at 146–148° C. (decomp.).

$C_{13}H_8N_4O_4$ (284). Calc. (percent): C, 54.92; H, 2.82; N, 19.72. Found (percent): C, 54.91; H, 3.34; N, 19.2.

EXAMPLE 9

Salt of 2-[2-(5-nitro-2-furyl)-vinyl]-6-pyridyl-bromomethylketone with hexamethylenetetramine 0.2 g. of the diazoketone prepared according to the procedure of Example 8 was dissolved in 3 ml. dimethylformamide and diluted with 3 ml. dioxane. Thereafter 2.6 ml. of a 48% aqueous solution of hydrogen bromide were added to the resulting solution. After the evolution of nitrogen had ended, the clear solution was neutralized with an aqueous solution of sodium acetate and diluted with 25 ml. water. The crystalline product which formed was separated by suction filtering and washed with water. There were thus produced 0.2 g. of crude 2-[2-(5-nitro-2-furyl)-vinyl]-6-pyridylbromomethylketone having a melting point of 145–146° C. (decomp.). The crude substance was dissolved in 5 ml. chloroform, a solution of 0.1 g. hexamethylenetetramine in 2.5 ml. chloroform was added thereto, and the crystals obtained on allowing the mixture to stand for a time were recovered by suction filtering and washed with chloroform. 0.22 g. of the hexamethylenetetramine salt, which decomposes at a temperature of between 157 and 163° C. and which is soluble in water were obtained.

EXAMPLE 10

1-(5-nitro-2-furyl)-2-(6-amino-5-nitro-2-pyridyl)-ethylene 0.77 g. 2-methyl-5-nitro-6-amino-pyridine were heated together with 7.5 ml. acetic anhydride for 15 minutes at 160° C. (bath temperature). Thereafter 0.7 g. crude 5-nitro-2-fural were added and the mixture was boiled for another 6 hours under reflux (160° C. bath temperature). The mixture was then vacuum concentrated and the concentrate treated with isopropylether. The undissolved material was boiled out repeatedly and treated at boiling temperature with benzene. From the vacuum-concentrated benzene extracts there was obtained 1 g. of residue, which was treated by boiling first with 10 ml. and then with 5 ml. of isopropanol. The residue thus obtained (0.7 g.) was treated with 3 ml. glacial acetic acid and 3 ml. 5 N hydrochloric acid for 1 hour at 100° C. Upon cooling, 0.5 g. of the crude hydrochloride of 1-(5-nitro - 2 - furyl) - 2-(6-amino-5-nitro-2-pyridyl)-ethylene was precipitated (melting point 213–214° C., decomp.). The free base was obtained by dissolving this salt in dioxane and a small amount of water, with heating followed by adding excess aqueous ammonia solution, and suction-filtering the yellow crystalline product which formed. After recrystallization from 3 ml. dioxane, the compound melted at 219–220° C. (decomp.).

$C_{11}H_8N_4O_5$ (276). Calc. (percent): C, 47.75; H, 2.9; N, 20.27. Found (percent): C, 47.53; H, 2.93; N, 1976.

EXAMPLE 11

1-(5-nitro-2-furyl)-2-(2-amino-6-pyridyl)-ethylene 17.28 g. 2-amino-6-methylpyridine were reacted with 5-nitro-2-fural in a manner analogous to that described in connection with the isomeric compound in Example 4. The addition of the 22.4 g. 5-nitro-2-fural was conducted by using 4 portions of 5.6 g. each, spaced 2 hours apart. The benzene solution was concentrated by evaporation and the concentrate taken up in 100 ml. carbon tetrachloride. The undissolved matter was separated out (0.7 g.) and the clear filtrate concentrated by evaporation. 25.5 g. of an oily residue were thus obtained.

The 0.7 g. undissolved material [crude 1-(5-nitro-2-furyl)-2-(2-acetamido-6-pyridyl)-ethylene] were hydrolyzed with 2 ml. glacial acetic acid and 2 ml. 6 N hydrochloric acid for 1 hour at 100° C., and the solution then concentrated by evaporation. The concentrate was dissolved in water and a little dilute hydrochloric acid with the application of heat, the undissolved matter removed, and the filtrate treated with activated charcoal. After filtration the filtrate, while still hot, was adjused to a pH of about 10 with ammonia. The 1-(5-nitro-2-furyl)-2-(2-amino-6 - pyridyl) - ethylene orange-colored crystals which were thus precipitated (0.25 g.) melted at 191–192° C.

The oily evaporation concentrate (25.5 g.) was also saponified with acid (70 ml. glacial acetic acid, 70 ml. 5 N hydrochloric acid), 1 hour at 100° C. and then vacuum concentrated. The concentrate was dissolved hot with 120 ml. 50% aqueous methanol solution and treated with activated charcoal. 0.6 g. of material having a melting point of 178–183° C. could be precipitated from the clear, still hot filtrate, by the addition thereto of excess ammonia. This product was dissolved in hot benzene, any undissolved matter was removed, and the filtrate concentrated by evaporation. The concentrate, following recrystallization from 10 ml. 50% aqueous dioxane solution, yielded 0.3 g. of crystals having a melting point of 189–190° C. and was identical with the above product.

$C_{11}H_9N_3O_3$ (231). Calc. (percent): C, 57.1; H, 3.9; N, 18.18. Found (percent): C, 56.6; H, 3.88; N, 17.93.

EXAMPLE 12

1-(5-nitro-2-furyl)-2-(5-amino-2-pyridyl)-ethylene 4 g. crude 2-methyl-5-amino-pyridine, produced by the catalytic hydrogenation of the corresponding nitro compound with a palladium catalyst, were heated with 40 ml. acetic anhydride for 30 minutes with reflux (160° C. bath temp.), and 5.2 g. 5-nitro-2-furfurole were then added. The mixture was heated for an additional 3 hours at 160° C. bath temperature and a further 1.75 g. nitrofurfurole added. The mixture was then kept for 3 hours at 160° C. After cooling, the precipitated black matter was separated out by suction filtering, washed with glacial acetic acid, and boiled out 3 times with 20 ml. portions of dioxane. The undissolved matter was removed by suction filtering, and the combined dioxane filtrates vacuum concentrated (0.7 g. of concentrate). The acetic anhydride mother liquor was also vacuum concentrated, and this concentrate boiled with 150 ml. benzene and then boiled twice with 60 ml. portions of dioxane. The combined dioxane extracts precipitated 0.85 g. of yellow crystals having a melting point of 269–271° C.

(decomp.). Upon cooling there were obtained crude 1-(5-nitro-2-furyl)-2-(5-acetamido-2-pyridyl)-ethylene.

Calculated acetyl (percent): 15.75. Found (percent): 15.17%.

The dioxane filtrate was concentrated by evaporation and the concentrate thus obtained (0.9 g.) combined with the previously recovered 0.7 g. of dioxane evaporation residue. This amorphous product similarly was crude 1-(5-nitro-2-furyl)-2 - (5 - acetamido-2-pyridyl)-ethylene. Another 5 g. of this compound (as a semi-crystalline crude product) was obtained by concentrating the above-mentioned clear benzene solution by evaporation, treating the concentrate thus produced with 15 ml. isopropanol, and suction filtering to remove any undissolved matter.

0.85 g. of the 1 - (5-nitro-2-furyl)-2-(5-acetamido-2-pyridyl)-ethylene thus obtained was hydrolyzed with 29 ml. 5 N hydrochloric acid (30 min. at 100° C.). 0.7 g. crude 1-(5-nitro - 2 - furyl)-2-(5-amino-2-pyridyl)-ethylene hydrochloride having a melting point of 260–266° C. (decomp.) could be recovered by suction filtering following cooling. This salt (0.5 g.) could be converted to the dark red, free amine by dissolving the salt in 25 ml. hot, acidified water, treating the hot solution with 0.2 g. activated charcoal, and adding concentrated ammonia to the hot, acid filtrate up to about pH 10. The yield after suction filtering and washing with water amounted to 0.35 g. (melting point 255–258° C.) (decomp.).

$C_{11}H_9N_3O_3$ (231). Calc. (percent): C, 57.1; H, 3.9; N, 18.18. Found (percent): C, 57.04; H, 3.8; N, 18.13. Found mol. wt. 230 (with $HClO_4$ in glacial acetic acid, potentiometric titration).

EXAMPLE 13

1-(5-nitro-2-furyl)-2-(3-acetoxy-2-pyridyl)-ethylene 1.74 g. 3-hydroxy-2-methylpyridine hydrochloride were boiled with 4.8 ml. glacial acetic acid, 7.2 ml. acetic anhydride and 0.96 g. sodium acetate for 1½ hours under reflux. Thereafter 1.8 g. 5-nitro-2-furfurole were added and the mixture refluxed for another 3 hours. After cooling, some black material was removed by suction filtering, and washed back into the filtrate with glacial acetic acid. The clear solution remaining was then vacuum concentrated. The concentrate was thoroughly treated with benzene, the undissolved matter filtered out, and the benzene filtrate vacuum concentrated. The oily residue thus produced was taken up in a little methanol and yielded 0.4 g. of yellow crystals melting at 137–140° C.

$C_{13}H_{10}N_2O_5$ (274). Calc. (percent): C, 56.8; H, 3.65; N, 10.23; acetyl, 15.7. Found (percent): C, 57.33; H, 4.07; N, 10.16; acetyl, 15.7.

EXAMPLE 14

1-(5-nitro-2-furyl)-2-(3-hydroxy-2-pyridyl)-ethylene 2 g. of the compound produced as described in Example 13 were heated with 20 ml. 2 N hydrochloric acid for 1 hour at 70° C., and, after cooling to room temperature, the hydrochloride of 1-(5-nitro-2-furyl)-2-(3-hydroxy-2-pyridyl)-ethylene which precipitated out was removed by suction filtration, suspended in water and neutralized with sodium bicarbonate. The suspension was then filtered, washed with water, and the solid product thus obtained (1.6 g.) recrystallized from 13 ml. of a mixture of dimethylformamide and dioxane (2:1). There resulted 1.3 g. red crystals, which decomposed with foaming in the melting-point test black at 238–258° C. The substance dissolved easily in dilute aqueous caustic soda solution producing a dark red color, and, when acidified with dilute hydrochloric acid, precipitated as a yellow hydrochloride. Melting point, 235–245° C. (decomp.).

$C_{11}H_8N_2O_4 \cdot HCl$ (268.5). Calc. (percent): C, 49.15; H, 3.35; N, 10.42; Cl, 13.22. Found (percent): C, 49.43; H, 3.38; N, 10.19; Cl, 13.28.

EXAMPLE 15

1-(5-nitro-2-furyl)-2-(5-carboxyl-2-pyridyl)-ethylene 3.3 g. 2-methyl-3-carbethoxy-pyridine were boiled for 4 hours with 2.82 g. of 5-nitro-2-fural and 20 ml. acetic anhydride under reflux (160° C. bath temp.). Then the mixture was vacuum concentrated, and the crystalline product which formed after cooling and standing was removed by suction-filtering and washed with some glacial acetic acid. There were thus produced 3.7 g. 1-(5-nitro-2-furyl)-2-(5-carbethoxy-2-pyridyl)-ethylene having a melting point 183–187° C.

0.77 g. of this ester was dissolved in 56 ml. tetrahydrofuran and 16 ml. ethanol. Thereafter, at room temperature, a mixture of 12 ml. methanol and 2 ml. 2 N caustic soda solution were added, and the mixture allowed to stand for 15 minutes. 4 ml. water were then added and the mixture permitted to stand for an additional 5 minutes. Twice again 4 ml. portions of water were added at 5-minute intervals, followed by 8 ml. of water. The small amount of undissolved matter which formed was removed by suction-filtering, and the clear solution allowed to stand for another 30 minutes at room temperature. The mixture was then acidified with 2 N hydrochloric acid and the yellow crystals that precipitated out after some standing removed (0.48 g.). The crystals were recrystallized from a 1:1 mixture of dimethyl-formamide and dioxane. 0.32 g. of crystals were thus obtained, which decomposed with foaming in the aluminum melting-point block at 269° C.

$C_{12}H_8N_2O_5$ (260). Calc. (percent): C, 55.40; H, 3.08; N, 10.77. Found (percent): C, 55.05; H, 3.10; N, 10.38.

This compound dissolved in dilute aqueous ammonia solution and re-precipitated upon the addition of dilute hydrochloric acid.

EXAMPLE 16

1-(5-nitro-2-furyl)-2-(3,5-dicarboxyl-6-methyl-2-pyridyl)-ethylene 5 g. 2,6-dimethyl-3,5-dicarbethoxy-pyridine were boiled for 3 hours under reflux (bath temperature 160° C.) with 2.82 g. of 5-nitro-2-fural and 20 ml. acetic anhydride. Thereafter the mixture was vacuum concentrated. The yellow crystalline product which precipitated after standing at room temperature was removed by suction-filtering, and washed with some glacial acetic acid. There were recovered 5.7 g. of crude 1-(5-nitro-2-furyl)-2-(3,5-dicarbethoxy-6-methyl-2-pyridyl)-ethylene.

4.5 g. of this ester were then dissolved in 75 ml. hot dioxane. A mixture of 24 ml. methanol and 17.2 ml. 2 N caustic soda solution was added, and the solution permitted to stand for 3 minutes at room temperature. 480 ml. of water were then added and the mixture allowed to stand for 8 minutes. A small amount of undissolved matter which formed was rapidly removed by suction-filtering. The filtrate was immediately acidified with about 30 ml. 2 N hydrochloric acid, and the olive-yellow crystalline product that precipitated was separated by suction-filtering. After washing the crystals (3.2 g.) with water and vacuum drying, they were dissolved in 30 ml. dioxane. 150 ml. benzene were added and the dark brown material that precipitated after about 10 minutes standing was suction-filtered out. The filtrate was vacuum concentrated and the evaporation residue (2.8 g.) recrystallized out of 60 ml. glacial acetic acid. The yield amounted to 1.8 g. of crystals which decomposed in the aluminum block between 210 and 244° C. A sample was recrystallized from dioxane and formed a crystalline product which decomposed with foaming in the aluminum block at 250° C.

EXAMPLE 17

1-(nitro-2-furyl)-2-(6-carboxyamido-2-pyridyl)-ethylene 0.7 g. of 2-[2-(5-nitro-2-furyl)-vinyl]-pyridine-6-carboxylic acid chloride, which had been prepared according to the procedure set out in Example 7 was dissolved in 10 ml. warm dioxane and this solution was slowly added, following cooling to room temperature, to a solution of 1 ml. concentrated aqueous ammonia and 1 drop of triethylamine in 10 ml. dioxane, whereupon yellow crystals were precipitated out. After suction filtration and washing with dioxane, the crystalline product (0.7 g.) was dissolved in 7 ml. hot formic acid, then treated with 35 ml. water, and the precipitated crystals were separated by suction filtering after standing in an ice bath. Following recrystallization of this material (0.6 g.) from 40 ml. glacial acetic acid, the crystals obtained decomposed with foaming on an aluminum block at a temperature of between 272 and 275° C.

$C_{12}H_9N_3O_4$ (259). Calc. (percent): C, 55.6; H, 3.48; N, 16.22. Found (percent): C, 55.46; H, 3.48; N, 15.76.

EXAMPLE 18

1-(5-nitro-2-furyl)-2-(4-carboxy-22-pyridyl)-2-methyl ethylene 4 g. 2-ethyl-4-carbethoxy pyridine were dissolved in 7.5 ml. of acetic anhydride and heated under reflux for 3 hours following addition thereto of 3.2 g. 5-nitro-2-furfural (160° C. bath temperature). After standing for some time at room temperature, the precipitated material which had formed was separated by suction-filtering, washed with a little glacial acetic acid, and the product (3.1 g.) crystallized from 40 ml. dioxane with the use of active charcoal. There was thereby obtained 2.2 g. of crystals having a melting point of 152–154° C., which crystals constituted the ethyl ester of 1-(5-nitro-2-furyl)-2-(4-carboxy-2-pyridyl)-2-methyl ethylene.

$C_{15}H_{14}N_2O_5$ (302). Calc. (percent): C, 59.6; H, 4.63; N, 9.27. Found (percent): C, 59.66; H, 4.61; N, 9.11.

1.3 g. of this carboxylic acid ethyl ester were dissolved with warming in a mixture of 10.5 ml. dimethylformamide and 4 ml. dioxane. 5.2 ml. of 1 N caustic soda were added to the resulting mixture at 35° C., and following 10 minutes of standing at room temperature, the solution was acidified with 2 N HCl and diluted with an equal volume of water, whereupon 1.15 g. of yellow crystals were precipitated out. Following washing with water and drying, the crystals decomposed (foaming) between 248 and 255° C. (from 240° C. on, brown coloring). The carboxylic acid obtained in this matter could be recrystallized from aqueous dioxane.

$C_{13}H_{10}N_2O_5$ (274). Calc. (percent): C, 56.9; H, 3.65; N, 10.2. Found (percent): C, 56.98; H, 3.75; N, 9.65.

Equivalent weight found 278±1% (titrated with 0.1 N caustic soda in aqueous dioxane).

EXAMPLE 19

1-(5-nitro-2-furyl)-2-(4-acetamido-2-pyridyl)-ethylene 3.4 g. 4-amino-2-methyl pyridine were heated under reflux for 30 minutes with 31.4 ml. acetic anhydride. Thereafter 4.5 g. 5-nitro-2-furfural were added, and the resulting mixture kept for another 3 hours at 160° C. (bath temperature) under reflux. Thereafter a further 1.5 g. nitrofurfural were added, the mixture was again held for 3 hours at 160° C. bath temperature, and a final 1.5 g. nitrofurfural introduced. The mixture was heated for 2 more hours at the temperature mentioned above. After standing overnight at room temperature, the precipitated material was suction-filtered, washed with a little glacial acetic acid, dried (4.5 g.), boiled 3 times with 50 ml. of a dioxane-toluene mixture (1:2), and the combined clear extract solutions evaporated using vacuum. The evaporation residue was taken up in a little 80% aqueous ethanol (0.2 g.) and recrystallized from isopropanol. Yellow crystals were obtained having a melting point of 223–225° C. (decomposition).

$C_{13}H_{11}N_3O_4$ (273). Calc. (percent): C, 57.1; H, 4.03; N, 15.38. Found (percent): C, 57.62; H, 4.06; N, 14.92.

EXAMPLE 20

1-(5-nitro-2-furyl)-2-(6-acetamido-2-pyridyl)-ethylene 200 g. 2-amino-6-methyl pyridine were boiled under reflux with 500 ml. acetic anhydride for 30 minutes (stirring, 160° C. bath temperature) and reheated to the same temperature following addition of 260 g. 5-nitro-2-furfural. A further 50 g. nitrofurfural were thereupon added and the entire mixture was kept at 160° C. bath temperature for another 3 hours (reflux stirring). After standing overnight at room temperature, the precipitated material was suction-filtered off, washed with glacial acetic acid and dried in vacuum at 120° C. (350 g.).

70 g. of this product were boiled several times with 250 ml. of a dioxane-toluene mixture (1:2), and the combined clear filtrates were strongly concentrated, using vacuum, whereupon 9.2 g. of paper chromatography pure yellow crystals precipitated out from the solution. The crystalline material was recrystallized from dioxane and melted at 243–245° C. (decomposition).

$C_{13}H_{11}N_3O_4$ (273). Calc. (percent): C, 57.1; H, 4.03; N, 15.38. Found (percent): C, 57.03; H, 4.39; N, 15.31.

EXAMPLE 21

1-(5-nitro-2-furyl)-2-(4-amino-2-pyridyl)-ethylene 0.25 g. of the compound prepared according to the procedure set out in Example 19 were dissolved in a mixture of 1.3 ml. 5 N HCl and 1.3 ml. dioxane and the resulting solution heated for ½ hour at 100° C. (bath temperature). Following evaporation under vacuum, the residue was dissolved with a little water-dioxane mixture (1:1) and one drop of 2 N HCl, filtered off from the undissolved material, and the clear filtrate treated with concentrated ammonia until it had become basic. The thus precipitated product (0.12 g.) decomposed following washing with water and drying at about 203° C. (discoloration from 190° C. on).

$C_{11}H_9N_3O_3$ (231). Calc. (percent): C, 57.1; H, 3.9; N, 18.18. Found (percent): C, 56.74; H, 4.18; N, 18.02.

EXAMPLE 22

1-(5-nitro-2-furyl)-2-(4-carboxy-2-pyridyl)-ethylene 4 g. 2-methyl-pyridine-4-carboxylic acid methyl ester were heated under reflux with 4.11 g. 5-nitro-2-furfural in a mixture of 4 g. acetic anhydride and 0.8 glacial acetic acid for 3 hours (160° C. bath temperature). Following cooling, the mixture was taken up in isopropyl ether and suction-filtered. 6 g. of the solid raw product which was thereby obtained were boiled exhaustively with dioxane. From the combined hot filtrates, 3.9 g. of crystalline material were recovered after cooling, and a further 0.45 g. was recovered from the concentrated mother liquor. After recrystallization from 100 ml. dioxane in the presence of activated charcoal, 3.8 g. of a yellow substance having a melting point of 225–226° C. were obtained.

$C_{13}H_{10}N_2O_5$ (274). Calc. (percent): C, 56.92; H, 3.65; N, 10.22. Found (percent): C, 56.85; H, 4.04; N, 10.25.

2.5 g. of the methyl ester thus recovered were dissolved in 182 ml. of a dimethylformamide-dioxane mixture (2:1). 11 ml. of 1 N caustic soda were added to the resulting solution at 30° C. Following 10 minutes of standing at room temperature, another 2 ml. of 1 N caustic soda were added, and the mixture left to stand for another 10 minutes at room temperature, whereupon it was acidified with 2 N HCl, treated with approximately 3 times its volume of water, and after standing for 1 hour, the yellow crystals which formed were separated by suction-filtering and washed with water. The yield amount to 2.3 g. 1-(5-nitro-2-furyl)-2-(4-carboxy-2-pyridyl)-ethylene. The recovered compound decomposed between 280–290° C. following recrystallization from dimethyl formamide.

$C_{12}H_8N_2O_5$ (260). Calc. (percent): C, 55.4; H, 3.08; N, 10.78. Found (percent): C, 55.08; H, 3.44; N, 10.74.

EXAMPLE 23

1-(5-nitro-2-furyl)-2-(2-carboxy-4-pyridyl)-ethylene 4.6 g. 4-methyl-pyridine-carboxylic acid methyl ester were heated for 3 hours under reflux with 4.73 g. 5-nitro-2-furfural in a mixture of 4.6 g. acetic anhydride and 0.9 g. glacial acetic acid (160° C. bath temperature). After cooling, the mixture was treated with isopropyl ether and suction-filtered. 7.9 g. of filter residue were obtained. This residue was boiled exhaustively with dioxane following drying. The extracts were combined and evaporated under vacuum and yielded 4.7 g. of residue from which 2.3 g. of crystals melting at 204–205° C. were recovered after recrystallization from 120 ml. of 60% aqueous dioxane, using active charcoal.

1.5 g. of the 1-(5-nitro-2-furyl)-2-(2-carbomethoxy-4-pyridyl)-ethylene thereby obtained were dissolved in 110 ml. of a mixture of dimethylformamide-dioxane (2:1). 6.6 ml. 1 N caustic soda were added to the resulting solution which was allowed to stand for 10 minutes at room temperature. Thereafter another 1.1 ml. of caustic soda were added to the suspension which formed. After standing for an additional 10 minutes at room temperature, the suspension was suction-filtered and washed with the solvent mixture above named. The filter residue was treated with 150 ml. water to which 5.5 ml. of 2N HCl had been added and it was then suction filtered and washed with water (1 g.). After recrystallization from dimethylformamide-dioxane (1:1) using active charcoal, 0.6 g. of yellow crystals were precipitated which decomposed between 242 and 244° C.

$C_{12}H_8N_2O_5$ (260). Calc. (percent): N, 10.78. Found (percent): N, 10.65.

Equivalent weight found 264±1% (titrated with 0.1 N caustic soda in aqueous dioxane).

EXAMPLE 24

1-(5-nitro-2-furyl)-2-(2-acetamido-4-pyridyl)-ethylene 0.35 g. 1-(5-nitro-2-furyl)-2-(2-amino - 4 - pyridyl)-ethylene, prepared according to the method of Example 4 was heated for 30 minutes at 70° C. with 3.5 ml. acetic anhydride. The clear solution which was formed was evaporated under vacuum. The residue was taken up in ether and suction-filtered (0.4 g., melting point 188–190° C.). After recrystallization from dioxane, the crystalline compound melted at 190–191° C.

$C_{13}H_{11}N_3O_4$ (273) Calc. (percent), C, 57.1; H, 4.03; N, 15.4. Found (percent), C, 56.94; H, 4.29; N, 14.96.

EXAMPLE 25

1-(5-nitro-2-furyl)-2-(6-oxy-2-pyridyl)-ethylene 0.92 g. 1-(5-nitro-2-furyl)-2-(6-amino - 2 - pyridyl)-ethylene, prepared according to the method of Example 11 was dissolved in 36 ml. of a warm mixture of 20 ml. water, 8 ml. concentrated sulfuric acid, and 28 ml. dioxane. A solution of 1 g. sodium nitrite in 5 ml. water was added with stirring at room temperature. Following standing for 15 to 30 minutes at room temperature the mixture was slowly heated to 100° C. Following evaporation under vacuum and diluting with water concentrated ammonia was added until pH 3 was reached. The orange-colored crystals were filtered off with suction, washed with water and dried in a vacuum (yield 1 g.). After recrystallization from a mixture of dioxane and dimethylformamide (3:1) the 1-(5-nitro-2-furyl)-2-(6-oxy-2-pyridyl)-ethylene melted at 279° C. (decomposition).

$C_{11}H_8N_2O_4$ (232). Calcd. (percent): C, 56.9; H, 3.45; N, 12.70. Found (percent): C, 56.36; H, 3.8; N, 12.04.

The substance dissolved with a deep orange color in excessive diluted caustic soda and precipitated after acidifying the solution with diluted hydrochloric acid.

EXAMPLE 26

1-(5-nitro-2-furyl)-(2-hydroxy-4-pyridyl)-ethylene 0.7 g. 1-(5-nitro-2-furyl)-2-(2-amino - 4 - pyridyl)-ethylene prepared as set out in Example 4, was dissolved in a warm mixture of 10 ml. water, 4 ml. concentrated sulfuric acid, and 14 ml. dioxane. An ice-cold solution of 0.78 g. sodium nitrite in 3.6 ml. water was then poured into the mixture under stirring and at room temperature. The mixture was stirred for another 30 minutes at room temperature and then heated up to 50° C. for 10 minutes, diluted with water and adjusted to a pH value of about 3 with strong aqueous ammonia solution. The crystals thereupon formed were filtered off, washed with water and dried. 0.5 g. of crystals were then recrystallized from 4 ml. dimethyl formamide. The yellow crystals thus produced were washed with dioxane and dried.

Yield—0.32 g. 4-[2-(5-nitro-2-furyl)-vinyl]-pyridone-2 having a melting point of 280–283° C. (decomp.).

$C_{11}H_8N_2O_4$ (232). Calc. (percent): C, 56.8; H, 3.45; N, 12.07. Found (percent): C, 56.13; H, 3.78; N, 12.34.

EXAMPLE 27

1-(5-nitro-2-furyl)-2-(6-chlor-2-pyridyl)-ethylene 0.46 g. 1-(5-nitro-2-furyl)-2-(α-pyridyl) - ethylene-N-oxide was heated together with 4 ml. phosphorous oxychloride for 1½ hours under reflux. The solution thereafter was evaporated in vacuo and the residue taken up in 7 ml. isopropanol. 0.16 g. of crystals were thereupon formed which following recrystallization from 4 ml. of a mixture of isopropanol/dioxane (2:1) melted at 180–182° C.

$C_{11}H_7ClN_2O_3$ (250.5). Calc. (percent): N, 11.17; Cl, 14.17. Found (percent): N, 11.13; Cl, 14.47.

EXAMPLE 28

1-(5-nitro-2-furyl)-2-(4-acetoxy-2-pyridyl)-ethylene 3 g. 4-nitro-2-methylpyridine were heated with 9 ml. acetanhyride and 3 g. 5-nitro-2-furfurol for 6 hours under reflux (160° C. bath temperature) and evaporated to dryness under vacuum. The residue was extracted with a mixture of toluene-dioxane (2:1). The extract was purified with active carbon and the clear solution obtained after filtration evaporated under vacuum. The recovered residue (4.6 g.) was taken up in a small amount of methanol whereby 1.6 g. of crystals were obtained which following recrystallization from 5 ml. dioxane-ethanol (1:1) melted at 144–146° C.

$C_{13}H_{10}N_2O_5$ (274). Calc. (percent): C, 56.95; H, 3.65; N, 10.22. Found (percent): C, 56.48; H, 3.84; N, 9.9.

EXAMPLE 29

1-(5-nitro-2-furyl)-2-(4-hydroxy-2-pyridyl)-ethylene

Variant I.—14.8 g. 1-(5-nitro-2-furyl)-2-(4-amino-2-pyridyl)-ethylene prepared according to Eample 21 were dissolved in 106 ml. of a warm mixture of 50 ml. water, 20 ml. concentrated sulfuric acid and 70 ml. dioxane. The mixture at a temperature of 15–20° C. was added dropwise to an ice-cold solution of 16.2 g. sodium nitrite in 75 ml. water under stirring. The resulting mixture was stirred for another 30 minutes at room temperature. The yellow precipitate which formed was separated off with suction and washed with water (15.5 g.). The crystals were thereafter heated in a mixture of glacial acetate acid/concentrated hydrochloric acid (1:1) for 30 minutes under reflux. Following cooling, the crystals were filtered off with suction and dried (12.6 g.). After recrystallization out of 400 ml. of 60% aqueous dioxane under addition of 5 ml. concentrated hydrochloric acid and active carbon, the crystals were dried under vacuum at 120° C. and then melted at 273–277° C. (decomposition with foaming in the aluminum block in 8 minutes). The yield of 1 - (5 - nitro - 2-furyl-2-(4-hydroxy-2-pyridyl)-ethylene hydrochloride amounted to 9.1 g.

$C_{11}H_8N_2O_4 \cdot HCl$ (268.5). Calc. (percent): N, 10.42; Cl, 13.22. Found (percent): N, 10.18; Cl, 13.07.

The hydrochloride was suspended in water and brought to solution by the addition of 2 N NaOH. The undissolved material was filtered off and the filtrate acidified with acetic acid. The olive-yellow crystals which formed were separated by suction-filtering, washed with water and dried. The dried crystals melted at 262° C. (decomposition with foaming in the aluminum block in heating for 8 minutes).

$C_{11}H_8N_2O_4$ (232). Calc. (percent): C, 56.8; H, 3.45. Found (percent): C, 56.7; H, 3.41.

Molecular weight: 234 (potentiometric titration with $HClO_4$ in glacial acetic acid).

Variant II.—19.8 g. 4-nitro-2-picoline were heated under reflux with 58 ml. acetanhydride and 22 g. 5-nitro-2-furfural for 9 hours and thereafter evaporated in vacuum. The black-brown residue was then heated with 100 ml. toluene to which a few drops of acetanhydride had been added and then filtered hot following addition of active carbon. The clear filtrate was then evaporated under vacuum. There were recovered 28 g. crude 1-(5-nitro-2-furyl)-2-(4-acetamido-2-pyridyl)-ethylene which could be used directly without further purification or which if desired could be extracted with ether before being worked further.

26 g. crude 1-(5-nitro-2-furyl)-2-(4-acetamido - 2 - pyridyl)-ethylene were heated to 60° C. for 1½ hours with 78 ml. of a mixture of 5 N hydrochloric acid and dioxane (1:1). Following cooling the precipitate which had formed was removed by suction filtering. 5.3 g. 1-(5-nitro-2-furyl)-2-(4-hydroxy - 2 - pyridyl)-ethylene hydrochloride were recovered which were purified by drying and heating with toluene. The dissolved crystallate was treated with active carbon, and 60% aqueous dioxane. Dilute hydrochloric acid was then added to the resulting solution. Following drying at 120° C. in vacuum, the compound melted at 269–273° C. (decomposition, following heating for about 8 minutes in the aluminum block).

$C_{11}H_8N_2O_4 \cdot HCl$ (268.5). Calc. (percent): C, 49.15; H, 3.35; N, 10.42; Cl, 13.22. Found (percent): C, 49.45; H, 3.79; N, 10.41; Cl, 13.24.

EXAMPLE 30

(1) 2.31 g. 1-(5-nitro-2-furyl)-2-(6 - amino-2-pyridyl)-ethylene were dissolved in 20 ml. dimethylformamide. 11.2 ml. of a 5% solution of peroxybenzoic acid in chloroform were added to the solution and it was allowed to stand for 30 minutes. After that time a further 11.2 ml. of the same solution were added and the solution allowed to stand for another 30 minutes. A final 11.2 ml. of 5% peroxybenzoic acid in chloroform were then added and the solution allowed to stand for 1 to 2 days. Thereafter under stirring 200 ml. of a mixture of ether-benzene (1:1) were added, the precipitate which formed separated by suction and the clear filtrate evaporated under vacuum. The residue was taken up in 200 ml. ether and the solid material (1.35 g.) crystallized out of 17 ml. 80% aqueous dioxane. There were recovered 0.75 g. of orange-red crystals having a melting point of 233–234° C. (decomposition; decolorizing at 215° C.). If desired, the crystals can be recrystallized from a mixture of dioxane-dimethylformamide (1:1).

(2) 8.1 g. 1 - (5 - nitro - 2 - furyl) - 2 - (2 - amino - 6-pyridyl)-ethylene were dissolved in 49 ml. of a warm mixture of dioxanedimethylformamide (3:1). There was introduced at 10–20° C. into this solution in portions a solution of 5.8 g. peroxybenzoic acid in 80 ml. chloroform under cooling so that the temperature did not rise above +20° C. After about 24 hours of standing at room temperature, the red crystals which formed were separated off with suction. The yield amounted to 2.7 g. The chloroform mother liquor was treated with water in an amount corresponding to the volume of liquor, neutralized with sodium bicarbonate and there were recovered a further 3.55 g. of desired material. 4.2 g. of the combined material were crystallized out of 93 ml. 60% aqueous dimethylformamide (addition of active carbon). The recovered product melted at 235° C. (foaming). It is the same product as described above under (1), namely, the N-oxide of 1 - (5 - nitro - 2 - furyl) - 2 - (2 - amino - 6 - pyridyl)-ethylene.

The compositions of the invention are put up in any suitable dosage form such as tablets, or the common powder-mix papers, or capsules, for oral administration. They can also be, when dissolved in water, introduced directly into the natural or pathological cavities of the organism, such as the blood vessels, the urethra and bladder, the veins and ureters, the digestive system and annexed parts, etc. Additionally, the compounds of the invention may be applied topically in the form of lotions, salves, and unguents. In all cases there is preferably included a suitable diluent, carrier or binder, as the case may require, the same being per se non-toxic when taken in the amount and frequency resulting from the administration regimen of the preparation.

We claim:
1. A compound designated 2 - [2 - (5 - nitro - 2 - furyl)-vinyl]-pyridine-6-carboxylic acid.
2. A compound designated 2 - [2 - (5 - nitro - 2 - furyl)-vinyl] - pyridine - 6 - carboxylic acid - betaoxyethylamide.
3. A compound designated 1 - (5 - nitro - 2 - furyl)-2-(2-amino-6-pyridyl)-ethylene-N-oxide.

References Cited
UNITED STATES PATENTS 3,352,683   11/1967   Schmidt et al. _____ 260—240

OTHER REFERENCES

Miura et al.: J. Pharm. Soc. Japan, vol. 85, pp. 289–298 (April 1965).

JOHN D. RANDOLPH, Primary Examiner

U.S. Cl. X.R.

260—296; 424—263

Boehr. 241.2
PF/ey
PO-1050
(5/69)

UNITED STATES PATENT OFFICE
CERTIFICATE OF CORRECTION

Patent No. 3,532,691      Dated October 6, 1970

Inventor(s) Erich Haack, Herbert Berger and Wolfgang Vömel

It is certified that error appears in the above-identified patent and that said Letters Patent are hereby corrected as shown below:

Column 3, line 67, "pyridyly" should be --pyridyl--.

Column 8, line 34, "adjused" should be -- adjusted --.

Column 9, line 68, "black" should be -- block --.

Column 11, line 18, "(4-carboxy-22 pyridyl)" should be -- (4-carboxy-2-pyridyl) --.

Column 13, line 71, "12.70" should be -- 12.07 --.

Column 14, line 65, "acetate" should be --acetic--.

Column 16, line 8, "was" should be -- were --.

SIGNED AND
SEALED
JAN 5 1971

(SEAL)
Attest:

Edward M. Fletcher, Jr.
Attesting Officer

WILLIAM E. SCHUYLER, JR.
Commissioner of Patents